US009068524B2

(12) United States Patent
Malik et al.

(10) Patent No.: US 9,068,524 B2
(45) Date of Patent: Jun. 30, 2015

(54) FAULT ANALYSIS METHOD AND FAULT ANALYSIS DEVICE FOR AN INTERNAL COMBUSTION ENGINE

(75) Inventors: Shahid Afsar Malik, Regensburg (DE); Carl-Eike Hofmeister, Rengensburg (DE); Matthias Stampfer, Berching (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 961 days.

(21) Appl. No.: 13/147,725

(22) PCT Filed: Jan. 27, 2010

(86) PCT No.: PCT/EP2010/050916
§ 371 (c)(1),
(2), (4) Date: Aug. 3, 2011

(87) PCT Pub. No.: WO2010/089236
PCT Pub. Date: Aug. 12, 2010

(65) Prior Publication Data
US 2011/0295485 A1 Dec. 1, 2011

(30) Foreign Application Priority Data
Feb. 4, 2009 (DE) .................... 10 2009 007 365

(51) Int. Cl.
*F02D 41/22* (2006.01)
*F02D 41/00* (2006.01)
*F02D 41/40* (2006.01)

(52) U.S. Cl.
CPC ............ *F02D 41/0085* (2013.01); *F02D 41/22* (2013.01); *F02D 41/40* (2013.01); *Y02T 10/40* (2013.01)

(58) Field of Classification Search
CPC ... F02D 41/0085; F02D 41/004; F02D 41/40; F02D 41/16
USPC .............. 701/102, 103, 104, 29.1; 73/114.01, 73/114.02, 114.04; 123/436
See application file for complete search history.

(56) References Cited

U.S. PATENT DOCUMENTS 4,590,907 A * 5/1986 Tsukamoto et al. .......... 123/357
4,697,561 A * 10/1987 Citron ...................... 123/339.14
(Continued)

FOREIGN PATENT DOCUMENTS

| DE | 4104742 A1 | 9/1991 | .............. F02D 41/00 |
| DE | 4122139 A1 | 1/1993 | .............. F02D 41/14 |

(Continued)

OTHER PUBLICATIONS

International Search Report and Written Opinion for Application No. PCT/EP2010/050916 (14 pages), Apr. 23, 2010.

*Primary Examiner* — Hieu T Vo
*Assistant Examiner* — Arnold Castro
(74) *Attorney, Agent, or Firm* — Slayden Grubert Beard PLLC

(57) ABSTRACT

In a fault analysis method for an internal combustion engine having a plurality of cylinders, an angular speed of the internal combustion engine is determined, and one parameter of the combustion process of one of the plurality of cylinders (6) is adapted in order to equalize the times taken by the internal combustion engine to cover in each case one angle interval. To provide a fault analysis method which makes it possible to detect a defective cylinder (6), it is determined that one of the plurality of cylinders (6) is defective on the basis of the value of the parameter.

17 Claims, 2 Drawing Sheets

(56) References Cited

U.S. PATENT DOCUMENTS

| | | | |
|---|---|---|---|
| 4,932,379 A * | 6/1990 | Tang et al. | 123/436 |
| 5,117,793 A | 6/1992 | Taue et al. | F02D 41/04 |
| 5,385,129 A | 1/1995 | Eyberg | 123/436 |
| 5,448,976 A * | 9/1995 | Treinies et al. | 123/406.23 |
| 6,082,187 A * | 7/2000 | Schricker et al. | 73/114.13 |
| 6,158,273 A | 12/2000 | Jeremiasson et al. | 73/117.3 |
| 6,234,010 B1 * | 5/2001 | Zavarehi et al. | 73/114.15 |
| 6,546,912 B2 * | 4/2003 | Tuken | 123/436 |
| 6,923,155 B2 * | 8/2005 | Gottemoller et al. | 123/198 F |
| 6,964,261 B2 * | 11/2005 | Warne et al. | 123/436 |
| 7,693,644 B2 * | 4/2010 | Aliakbarzadeh et al. | 701/105 |
| 7,962,277 B2 * | 6/2011 | Hofmeister et al. | 701/110 |
| 8,036,811 B2 * | 10/2011 | De Fazio et al. | 701/103 |
| 2003/0131823 A1 * | 7/2003 | Asakawa | 123/436 |
| 2003/0196633 A1 * | 10/2003 | Gottemoller et al. | 123/198 F |
| 2010/0211291 A1 * | 8/2010 | Sumitani et al. | 701/104 |

FOREIGN PATENT DOCUMENTS

| | | | |
|---|---|---|---|
| DE | 19946911 A1 | 4/2001 | F02D 41/22 |
| EP | 1215386 A2 | 6/2002 | F02D 41/00 |
| JP | 61014446 A | 1/1986 | F02D 41/36 |
| WO | 2010/089236 A1 | 8/2010 | F02D 41/00 |

* cited by examiner

FAULT ANALYSIS METHOD AND FAULT ANALYSIS DEVICE FOR AN INTERNAL COMBUSTION ENGINE

CROSS-REFERENCE TO RELATED APPLICATIONS

This application is a U.S. National Stage application of International Application No. PCT/EP2010/050916 filed Jan. 27, 2010, which designates the United States of America, and claims priority to German Application No. 10 2009 007 365.5 filed Feb. 4, 2009, the contents of which are hereby incorporated by reference in their entirety.

TECHNICAL FIELD

The present invention relates to a fault analysis method, a fault analysis device, and an internal combustion engine controller having a fault analysis device.

BACKGROUND

A fault analysis device of said type for an internal combustion engine having a plurality of cylinders, wherein an angular speed of the internal combustion engine is determined, and wherein a parameter of the combustion process of one of the plurality of cylinders is adapted in order to equalize the times in which the internal combustion engine covers in each case one angular interval, is known from U.S. Pat. No. 6,158,273. The internal combustion engine is a spark-ignition engine, the ignition times of which are adapted. The fault itself consists in the incorrect ignition times. Said fault is corrected by the fault analysis device. The ignition time is not used to draw conclusions regarding a defect of one of the cylinders, which is for example the cause of the incorrect ignition time.

SUMMARY

According to various embodiments, a fault analysis method, a fault analysis device and an internal combustion engine controller can be provided which make it possible to identify a defective cylinder.

According to an embodiment, a fault analysis method for an internal combustion engine may have a plurality of cylinders, wherein an angular speed of the internal combustion engine is determined, and wherein a parameter of the combustion process of one of the plurality of cylinders is adapted in order to equalize the times in which the internal combustion engine covers in each case one angular interval, wherein, on the basis of the value of the parameter, it is determined that the one of the plurality of cylinders is defective.

According to a further embodiment, a defect of the one of the plurality of cylinders can be identified if the value of the parameter falls below a lower limit, or the value of the parameter exceeds an upper limit. According to a further embodiment, According to a further embodiment, further parameters of the other cylinders can be adapted in order to keep the internal combustion engine rotational speed constant. According to a further embodiment, a defect of the one of the plurality of cylinders can be identified if a value of at least one further parameter falls below a lower limit and at the same time an injection quantity is above a lower limit, or if a value of the further parameter exceeds an upper limit and at the same time an injection quantity is below a lower limit. According to a further embodiment, injection quantities in in each case one of the plurality of cylinders can be calculated from the change in the angular speed of the internal combustion engine. According to a further embodiment, for the calculation of the injection quantities, it may be assumed that the change in the angular speed is dependent in each case on a first injection quantity and at least one second injection quantity. According to a further embodiment, there can be assumed to be a linear relationship between a change in the kinetic energy on account of the change in the angular speed and the first injection quantity, and in that there is assumed to be a linear relationship between the change in the kinetic energy on account of the change in the angular speed and the second injection quantity. According to a further embodiment, the parameter can be the injection time at which fuel is injected into the one of the plurality of cylinders, and in that the further parameters are the injection time at which fuel is injected into in each case one of the other cylinders. According to a further embodiment, the average value of the parameters can be compared with an average value of the parameters without adaptation in order to check the result of the fault analysis method.

According to another embodiment, a fault analysis device for an internal combustion engine comprises a plurality of cylinders, having an angular speed determining device and having an internal combustion engine control device which is set up to adapt a parameter of the combustion process of one of the plurality of cylinders in order to equalize the times in which the internal combustion engine covers in each case one angular interval, wherein the fault analysis device is set up to determine, on the basis of the value of the parameter, that the one of the plurality of cylinders is defective.

According to a further embodiment of the device, the fault analysis device can be set up to identify a defect of the one of the plurality of cylinders if the value of the parameter falls below a lower limit, or if the value of the parameter exceeds an upper limit. According to a further embodiment of the device, the fault analysis device can be set up to adapt further parameters of the other cylinders in order to keep the internal combustion engine rotational speed constant. According to a further embodiment of the device, the fault analysis device can be set up to identify a defect of the one of the plurality of cylinders if a value of at least one further parameter falls below a lower limit and at the same time an injection quantity is above a lower limit, or if a value of the further parameter exceeds an upper limit and at the same time an injection quantity is below a lower limit. According to a further embodiment of the device, the fault analysis device can be set up to calculate injection quantities in in each case one of the plurality of cylinders from the change in the angular speed of the internal combustion engine. According to a further embodiment of the device, the fault analysis device can be set up to compare the average value of the parameters with an average value of the parameters without adaptation in order to check the result of the fault analysis.

According to yet another embodiment, an internal combustion engine controller may have a fault analysis device for an internal combustion engine having a plurality of cylinders, having an angular speed determining device, wherein the internal combustion engine control device is set up to adapt a parameter of the combustion process of one of the plurality of cylinders in order to equalize the times in which the internal combustion engine covers in each case one angular interval, wherein the fault analysis device is set up to determine, on the basis of the value of the parameter, that the one of the plurality of cylinders is defective.

BRIEF DESCRIPTION OF THE DRAWINGS

The invention will be described in more detail below with reference to the drawings, in which.

DETAILED DESCRIPTION

Figure 1:
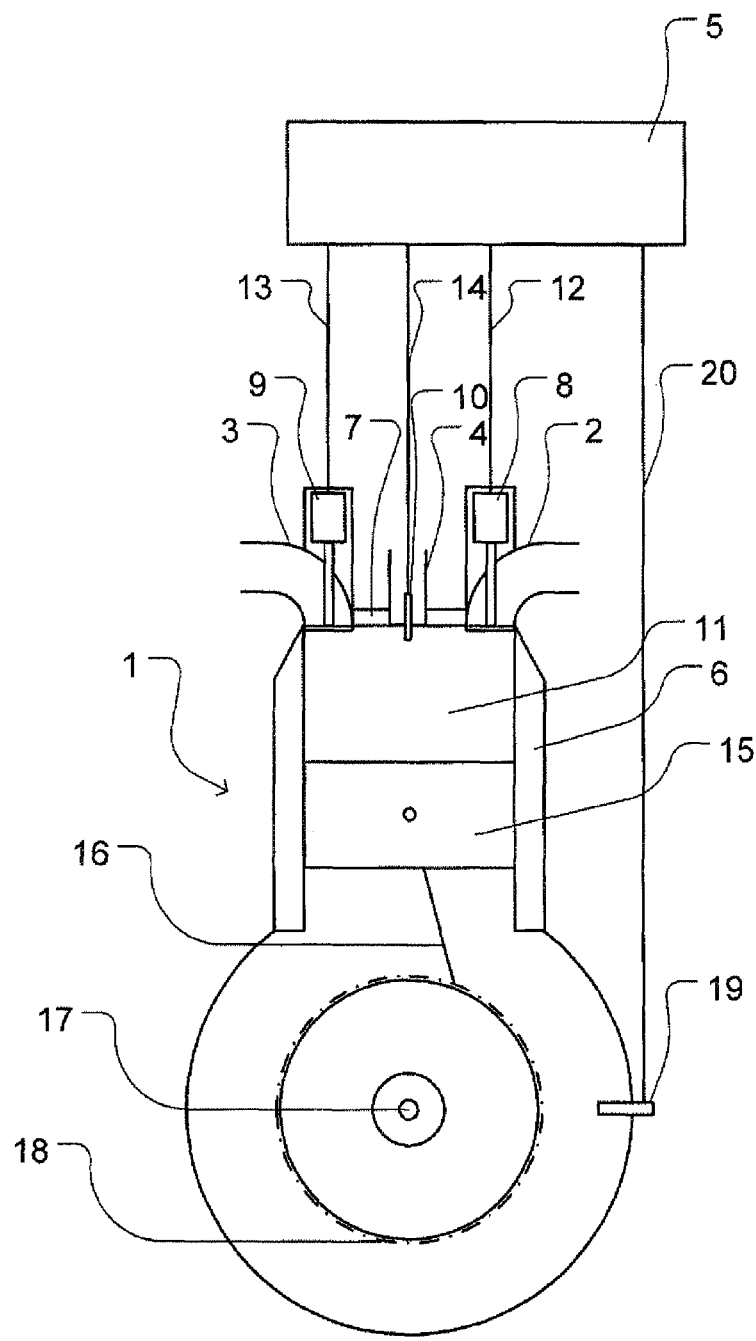
FIG. 1 shows a schematic view of an internal combustion engine of a motor vehicle.

In a fault analysis method for an internal combustion engine, on the basis of the value of the parameter, it is determined that one of the plurality of cylinders is defective. According to various embodiments, the cylinder comprises for example the cylinder piston, cylinder rings, the cylinder head with an injector, an inlet valve, an outlet valve etc. According to various embodiments, a defect is to be understood to mean an intolerable deviation of a fixed property of a part of the cylinder from a desired property of the part. An ignition time, which is variable, is not a fixed property and is therefore not a defect according to various embodiments. It is also possible for in each case one parameter of a plurality of cylinders to be adapted, that is to say a parameter of at least one cylinder is adapted. In the fault analysis method, it is advantageously possible for components to be used which are already present in conventional internal combustion engines with cylinder equalization regulation.

In an embodiment, a defect of the one of the plurality of cylinders is identified if the value of the parameter falls below a lower limit, or the value of the parameter exceeds an upper limit. The lower limit and the upper limit are defined in relation to typical values of the parameter for a functional cylinder.

In an embodiment, further parameters of the other cylinders are adapted in order to keep the internal combustion engine rotational speed constant. Therefore, only parameters for a single internal combustion engine rotational speed are taken into consideration, such that the behavior of the parameter needs to be known only for that internal combustion engine rotational speed in order to assess whether a defect is present. In fact, the desired aim, that of keeping the internal combustion engine rotational speed constant, often cannot be achieved.

According to a further embodiment, a defect of the one of the plurality of cylinders is identified if a value of at least one further parameter falls below a lower limit and at the same time an injection quantity is above a lower limit, or if a value of the further parameter exceeds an upper limit and at the same time an injection quantity is below a lower limit. The lower limit and the upper limit are defined in relation to typical values of the parameter for a functional cylinder. It is also possible for only that cylinder whose injection quantity is also extremal to be regarded as being defective.

According to a further embodiment, injection quantities in in each case one of the plurality of cylinders are calculated from the change in the angular speed of the internal combustion engine. This makes it possible to determine the injection quantities without the need for a further sensor.

According to a further embodiment, for the calculation of the injection quantities, it is assumed that the change in the angular speed is dependent in each case on a first injection quantity and at least one second injection quantity. It is therefore possible to produce a functional relationship between the injection quantities and the angular speed, which functional relationship is easy to analyze.

According to a further embodiment, there is assumed to be a linear relationship between a change in the kinetic energy on account of the change in the angular speed and the first injection quantity, and there is assumed to be a linear relationship between the change in the kinetic energy on account of the change in the angular speed and the second injection quantity. The injection quantities can therefore be calculated by solving a linear system of equations.

According to a further embodiment, the parameter is the injection time at which fuel is injected into the one of the plurality of cylinders, and in that the further parameters are the injection time at which fuel is injected into in each case one of the other cylinders. Said method is particularly suitable for a diesel engine. A possible cause of the deviation of the injection time is in particular a defect of the injection nozzle, such as inadequate opening or closing.

According to a further embodiment, the average value of the parameters is compared with an average value of the parameters without adaptation in order to check the result of the fault analysis method. To obtain the average value of the parameters without adaptation, a cylinder equalization regulating system, for example, is deactivated.

According to various embodiments, a fault analysis device for an internal combustion engine is set up to determine, on the basis of the value of the parameter, that the one of the plurality of cylinders is defective.

In an embodiment, the fault analysis device is set up to identify a defect of the one of the plurality of cylinders if the value of the parameter falls below a lower limit, or if the value of the parameter exceeds an upper limit.

According to a further embodiment, the fault analysis device is set up to adapt further parameters of the other cylinders in order to keep the internal combustion engine rotational speed constant.

According to a further embodiment, the fault analysis device is set up to identify a defect of the one of the plurality of cylinders if a value of at least one further parameter falls below a lower limit and at the same time an injection quantity is above a lower limit, or if a value of the further parameter exceeds an upper limit and at the same time an injection quantity is below a lower limit.

According to a further embodiment, the fault analysis device is set up to calculate injection quantities in in each case one of the plurality of cylinders from the change in the angular speed of the internal combustion engine.

According to a further embodiment, the fault analysis device is set up to compare the average value of the parameters with an average value of the parameters without adaptation in order to check the result of the fault analysis.

According to further embodiments, an internal combustion engine controller may have a fault analysis device, wherein the fault analysis device is set up to determine, on the basis of the value of the parameter, that the one of the plurality of cylinders is defective.

FIG. 1 shows a schematic view of an internal combustion engine of a motor vehicle. The internal combustion engine comprises an internal combustion engine block 1, an intake tract 2, an exhaust tract 3, a common rail distributor pipe 4 and an internal combustion engine controller 5 in the form of a microcontroller. The internal combustion engine block 1 comprises four cylinders, of which one cylinder 6 is illustrated. Arranged in a cylinder head 7 are an inlet valve 8, an outlet valve 9 and an injection nozzle 10. The inlet valve 8 closes or opens the access from the intake tract 2 to the combustion chamber 11. The outlet valve 9 closes or opens the access from the combustion chamber 11 to the exhaust tract 3. The injection nozzle 10 sprays fuel into the combustion chamber 11. This is therefore a diesel engine. The inlet valve 8, the outlet valve 9 and the injection nozzle 10 are controlled by the internal combustion engine controller 5 via electrical control lines 12, 13 and 14 respectively. A cylinder piston 15 is connected via a connecting rod 16 to a crankshaft 17 on which a crankshaft gearwheel 18 is mounted. An angular speed sensor 19 measures the angular speed of the crankshaft 17 and transmits an angular speed signal via an electrical line 20 to the internal combustion engine controller 5. The internal combustion engine controller 5 has an idle rotational speed regulator which regulates the idle rotational speed of the internal combustion engine and which cannot be deactivated, a cylinder equalization regulator which serves to ensure that each cylinder generates the same kinetic energy, as a result of which the internal combustion engine "runs true", and a fault analysis device which carries out the fault analysis process described below. The cylinder equalization regulator is also always activated during normal operation. It may however be deactivated. The idle rotational speed regulator, the cylinder equalization regulator and the fault analysis device are structurally identical to the internal combustion engine controller 5, which carries out an idle regulation function, a cylinder equalization regulation function and a fault analysis. The result of the fault analysis is depicted on a display device of the engine controller 5 or is transmitted via a data line to an external display device. The fault analysis device may however also be formed as an external analysis device which accesses the internal combustion engine controller 5, in order to read out data from the latter, via a data line.

Figure 2:
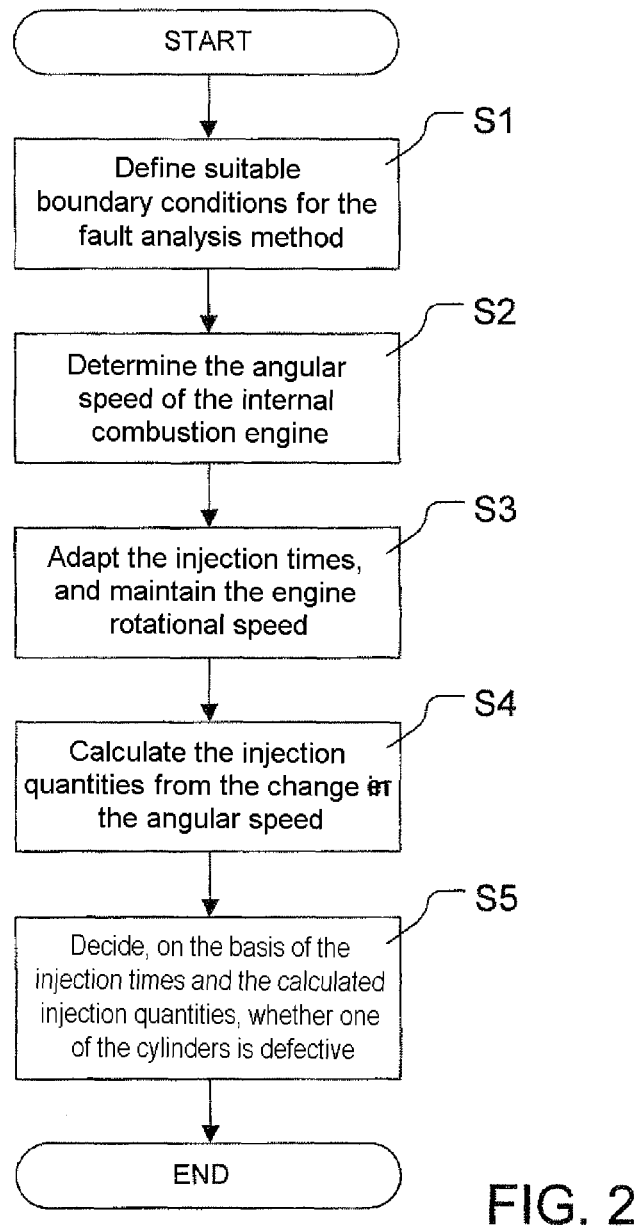
FIG. 2 shows a flow diagram of a fault analysis method.

FIG. 2 shows a flow diagram of a fault analysis method.

In step S1, suitable boundary conditions for the fault analysis method are firstly ensured. The internal combustion engine of the motor vehicle is in the idle running mode. All the additional electrical and mechanical consumers are deactivated. The internal combustion engine is in a normal temperature range. The idle rotational speed regulator is set such that it as far as possible does not influence the engine rotational speed N on account of fluctuations of the angular speed $\omega$ during a revolution of the crankshaft 17. The cylinder equalization regulator is deactivated. During an engine cycle $MZ_j$, where $j=1, 2, 3 \ldots$, the injection nozzles in each case spray fuel into the associated cylinder $Z_i$ ($i=1, 2, \ldots, n$) of the $n=4$ cylinders for the same predefined injection time period $t_{j,i}$. The predefined injection time periods $t_{j,i}$ yield the selected injection quantities $$m_{j,i} = \frac{c_t}{c_m} \cdot t_{j,i},$$

where $c_t$ and $c_m$ are constants characteristic of the engine. The selected injection quantities $m_{j,i}$ are injection quantities which should be injected, and which also are injected in the case of correct functioning. The average injection time period $\overline{t_j}$ in the engine cycle $MZ_j$ is defined as $$\overline{t_j} = \frac{1}{n} \cdot \sum_{i=1}^{n} t_{j,i}.$$

Correspondingly, the average selected injection quantity $\overline{m_j}$ in the engine cycle $MZ_j$ is defined as $$\overline{m_j} = \frac{1}{n} \cdot \sum_{i=1}^{n} m_{j,i}.$$

When the cylinder equalization regulator is deactivated, all the injection times and selected injection quantities are the same.

In step S2, the angular speed sensor 19 continuously measures the angular speed $\omega$ of the crankshaft 17 and transmits an angular speed signal to the internal combustion engine controller 5. In one engine cycle $MZ_j$, the angular speed $\omega$ has four maximum values attributed in each case to one ignition process in one of the cylinders $Z_i$. After the ignition process, the angular speed $\omega$ initially increases and then falls again on account of friction losses until the next ignition process. An engine cycle $MZ_j$ therefore has four angular intervals $\Delta\phi_i$ of equal magnitude, in which the angular speed $\omega$ increases to a maximum value.

In the step S3, the cylinder equalization regulator is activated again. The internal combustion engine controller 5 now controls the internal combustion engine such that the four angular intervals $\Delta\phi_i$ of equal magnitude are each covered in the same fixed time period. For this purpose, the internal combustion engine controller varies the injection times $t_i$ of the fuel injection for the individual cylinders $Z_i$. The cylinder equalization regulation is based on the approximated assumption that, in the steady state, the engine rotational speed N is proportional to the sum of the individual injection times $t_{j,i}$ or of the selected injection quantities $m_{j,i}$:

$$N = c_t \cdot (t_{j,1} + t_{j,2} + t_{j,3} + t_{j,4}) = c_m \cdot (m_{j,1} + m_{j,2} + m_{j,3} + m_{j,4})$$

Here, the average injection time period $\overline{t_j}$ and the average injection quantity $\overline{m_j}$ will generally vary for at least one defective cylinder.

The further description below will be given by way of example for the injection times $t_{j,i}$. The injection quantities $m_{j,i}$ need not be given as absolute values; they may rather be given as relative values. Here, the boundary conditions $\omega_{j+1,1} = \omega_{j,n+1}$ and $m_{j+1,1} = m_{j,n+1}$ apply.

Initially, all the injection times $t_{j,i}$ have the same value $t_0$. The internal combustion engine controller never changes only a single injection time $t_i$, but rather always changes at least the injection times $t_i$ of two cylinders $Z_i$ simultaneously in order to keep the engine rotational speed N as constant as possible. According to the regulation by the cylinder equalization regulator, therefore, the following applies in the steady state:

$$N \approx c \cdot (p_{j,1} + p_{j,2} + \ldots + p_{j,n}) \cdot t_0,$$

wherein for the sum of the parameters $p_{j,i}$, the following applies:

$$\frac{1}{n} \cdot (p_{j,1} + p_{j,2} + \ldots + p_{j,n}) = 1.$$

In practice, the range of possible values for the parameters $p_{j,i}$ is yet further restricted, as presented by way of example below:

$$0.5 \leq p_{j,i} \leq 1.5.$$

The parameters $p_{j,i}$ yielded by the cylinder equalization regulation are automatically known to the fault analysis device, because said cylinder equalization regulation is integrated as a special function in said fault analysis device. The idle speed regulator now adapts $t_0$ such that the internal combustion engine rotates again at the desired idle engine rotational speed N if this is required. Step S3 is possibly executed repeatedly until a satisfactory result is obtained.

In step S4, the fault analysis device calculates actual injection quantities $\Omega_{j,i}$ in each case one of the $n=4$ cylinders $Z_i$ from the change in the angular speed $\omega$ of the internal combustion engine in in each case one angular interval $\Delta\phi_i$. Here, for an internal combustion engine with $n=4$ cylinders $Z_i$, the fault analysis device is based on a model in which the change in the angular speed $\omega$ in an angular interval $\Delta\phi_i$ is based on an acceleration by in each case two cylinders $Z_i$ in which the fuel was most recently injected, and in which model additional kinetic energy $\Delta E_{j,i}$ on account of the acceleration in the angular interval $\Delta \phi_i$, which is proportional to the difference between the squares of the angular speeds at the start $\omega_{j,i}$ and at the end $\omega_{j,i+1}$, is in each case proportional to a first injection quantity $\Omega_{j,i}$ and proportional to a second injection quantity $\Omega_{j,i+1}$:

$$\Delta E_{j,i} = d \cdot (\omega_{j,i}^2 - \omega_{j,i+1}^2) = e \cdot \Omega_{j,i} + f \cdot \Omega_{j,i+1}$$

In the steady state, four equations are obtained for the four unknown injection quantities $\Omega_{j,i}$, such that the injection quantities $\Omega_{j,i}$ can be clearly defined. Said analysis may also be continued for a plurality of revolutions, wherein the resulting injection quantities $\Omega_{j,i}$ are statistically evaluated. Friction losses may possibly also be taken into consideration in the model. The factors e, f and d are engine-specific and are known, and may possibly be dependent on the angular speed $\omega$. For an internal combustion engine with more than four cylinders $Z_i$, the additional kinetic energy $\Delta E_i$ may also be dependent on more than two cylinders $Z_i$.

In step S5, the fault analysis device decides whether one of the cylinders $Z_i$ is defective. This is detected on the basis of the selected injection quantities $m_{j,i}$, factors $p_{j,i}$ and/or injection times $t_{j,i}$. These parameters are equivalent.

If it is the case for precisely one cylinder that the associated selected injection quantity $m_{j,i}$ is above an upper limit $M_o$ ($m_{j,i} \geq M_o$), and/or that the associated parameter $p_{j,i}$ is above an upper limit $P_o$ ($p_{j,i} \geq P_o$), and/or that the associated injection time $t_{j,i}$ is above an upper limit $T_o$ ($t_{j,i} \geq T_o$), this is defined as a defect. A typical cause may be for example an injector which can be opened only to an insufficient extent. An average injection quantity can be achieved for said cylinder only with an extremely long injection time. Furthermore, the change in the average injection quantity $\overline{m_j}$ or the average injection time period $\overline{t_j}$ may be used by the cylinder equalization regulation to check the result. Furthermore, it must specifically be the case that the average selected injection quantity $\overline{m_j}$ or the average injection time period $\overline{t_j}$ increases after the activation of the cylinder equalization. If this is not the case, the result of the fault analysis method is not consistent and is therefore erroneous.

If it is the case for a plurality of cylinders $Z_i$ that the associated selected injection quantity $m_{j,i}$ is above an upper limit $M_o$ ($m_{j,i} \geq M_o$), and/or that the associated parameter $p_{j,i}$ is above an upper limit $P_o$ ($p_{j,i} \geq P_o$), and/or that the associated injection time $t_{j,i}$ is above an upper limit $T_o$ ($t_{j,i} \geq T_o$), it is additionally possible for the associated calculated injection quantity $\Omega_{j,i}$ to be used as a criterion. A cylinder $Z_i$ is then defined as being defective if, for that cylinder, as a further criterion, at the same time the associated calculated injection quantity is below for example a lower limit $\Omega_u = 0.9 \Omega$, where $\Omega$ is an injection quantity conventionally injected at idle ($\Omega = \overline{m_j}$ for non-defective cylinders). It is alternatively also possible for only that cylinder $Z_i$ which simultaneously also has the lowest injection quantity $\Omega_{j,i}$ to be defined as being defective. The injection quantity may be calculated as specified above. The following values may for example be used as upper limits: $P_o = 1.5$, $T_o = 1.5 t_o$, $M_o = P_o \cdot m_o$ where $m_{j,i} = p_{j,i} \cdot m_0$. Even if the above conditions are satisfied for a plurality of cylinders, the change in the average injection quantity $\overline{m_j}$ or in the average injection time period $\overline{t_j}$ may similarly be used to check the result.

If it is the case for precisely one cylinder $Z_i$ that the associated selected injection quantity $m_{j,i}$ is below a lower limit $M_u$ ($m_{j,i} \leq M_u$), and/or that the associated parameter $p_{j,i}$ is below a lower limit $P_u$ ($p_{j,i} \leq P_u$), and/or that the associated injection time $t_{j,i}$ is below a lower limit $T_u$ ($t_{j,i} \leq T_u$), this is defined as a defect. A typical cause may be for example an injector which can be opened too far. An average injection quantity can be attained for said cylinder only with an extremely short injection time. Furthermore, again, the change in the average injection quantity $\overline{m_j}$ or in the average injection time period $\overline{t_j}$ may be used by the cylinder equalization to check the result. Furthermore, it must specifically be the case that the average selected injection quantity or the average injection time period $\overline{t_j}$ decreases after the activation of the cylinder equalization. If this is not the case, the result of the fault analysis method is not consistent and therefore erroneous.

If it is the case for a plurality of cylinders $Z_i$ that the associated selected injection quantity $m_{j,i}$ is below a lower limit $M_u$ ($m_{j,i} \leq M_u$), and/or that the associated parameter $p_{j,i}$ is below a lower limit $P_u$ ($p_{j,i} \leq P_u$), and/or that the associated injection time $t_{j,i}$ is below a lower limit $T_u$ ($t_{j,i} \leq T_u$), it is additionally possible for the associated calculated injection quantity $\Omega_{j,i}$ to be used as a criterion. A cylinder $Z_i$ is then defined as being defective if, for that cylinder, as a further criterion, at the same time the associated calculated injection quantity is above for example an upper limit $\Omega_o = 1.1 \Omega$, where $\Omega$ is an injection quantity conventionally injected at idle. It is alternatively also possible for only that cylinder $Z_i$ which simultaneously also has the lowest injection quantity $\Omega_{j,i}$ to be defined as being defective. The injection quantity may be calculated as specified above. The following values may for example be used as upper limits: $P_u = 0.5$, $T_u = 0.5 t_o$, $M_u = P_u \cdot m_0$ where $m_{j,i} = p_{j,i} \cdot m_0$. Even if the above conditions are satisfied for a plurality of cylinders, the change in the average injection quantity $\overline{m_j}$ or in the average injection time period $\overline{t_j}$ may similarly be used to check the result.

It is preferable for a fault to be recorded initially only for the most extreme cylinder $Z_i$ or single cylinder $Z_i$ that is defective. Said record then serves as a starting point for the further manual fault analysis or repair work for the defective cylinder. The analysis method may then be repeated, after the fault cause has been eliminated for the defective cylinder, in order to check whether a defect is still present.

What is claimed is:

1. A fault analysis method for an internal combustion engine having a plurality of cylinders, comprising:
   repeatedly determining an angular speed of the internal combustion engine, and
   adapting a parameter of the combustion process of one of the plurality of cylinders in order to equalize the times in which the internal combustion engine covers each of a plurality of angular intervals corresponding, to the plurality of cylinders, and
   determining an increase in the an angular speed of the internal combustion engine in each of the plurality of angular intervals, the angular speed increase in each angular interval resulting from an injection in a corresponding one of the cylinders,
   calculating an injection quantity for each cylinder based on the determined increase in angular speed corresponding to that cylinder,
   determining, base at least on the injection quantities calculated for each cylinder, that the one of the plurality of cylinders is defective.

2. The fault analysis method according to claim 1, wherein a defect of the one of the plurality of cylinders is identified if the value of the parameter falls below a lower limit, or the value of the parameter exceeds an upper limit.

3. The fault analysis method according to claim 1, wherein further parameters of the other cylinders are adapted in order to keep the internal combustion engine rotational speed constant.

4. The fault analysis method according to claim 3, wherein a defect of the one of the plurality of cylinders is identified if a value of at least one further parameter falls below a Lower Limit and at the same time an injection quantity is above a lower limit, or if a value of the further parameter exceeds an upper limit and at the same time an injection quantity is below a lower limit.

5. The fault analysis method according to claim 1, wherein, for the calculation of the injection quantities, the change in the angular speed is dependent in each case on a first injection quantity and at least one second injection quantity.

6. The fault analysis method according to claim 5, wherein a linear relationship exists between a change in the kinetic energy on account of the change in the angular speed and the first injection quantity, wherein a linear relationship exists between the change in the kinetic energy on account of the change in the angular speed and the second injection quantity.

7. The fault analysis method according to claim 3, wherein the parameter is the injection time at which fuel is injected into the one of the plurality of cylinders, and wherein the further parameters comprise an injection time for at least one of the other cylinders.

8. The fault analysis method according to claim 2, wherein the average value of the parameters is compared with an average value of the parameters without adaptation in order to check the result of the fault analysis method.

9. A fault analysis device for an internal combustion engine having a plurality of cylinders, having an angular speed determining device and having an internal combustion engine control device which is configured to:
  receive signals indicative of an angular speed of the internal combustion engine,
  adapt a parameter of the combustion process of one of the plurality of cylinders in order to equalize the times in which the internal combustion engine covers each of a plurality of angular intervals corresponding to the plurality of cylinders,
  determine an increase in the angular speed of the internal combustion engine in each of the plurality of angular intervals, the angular speed increase in each angular interval resulting from an injection in a corresponding one of the cylinders,
  calculate an injection quantity for each cylinder based on the determined increase in angular speed corresponding to that cylinder,
  determine, based at least on the injection quantities calculated for each cylinder, that the one of the plurality of cylinders is defective.

10. The fault analysis device according to claim 9, wherein the fault analysis device is set up to identify a defect of the one of the plurality of cylinders if the value of the parameter falls below a lower limit, or if the value of the parameter exceeds an upper limit.

11. The fault analysis device according to claim 10, wherein the fault analysis device is set up to adapt further parameters of the other cylinders in order to keep the internal combustion engine rotational speed constant.

12. The fault analysis device according to claim 11, wherein the fault analysis device is set up to identify a defect of the one of the plurality of cylinders if a value of at least one further parameter falls below a lower limit and at the same time an injection quantity is above a lower limit, or if a value of the further parameter exceeds an upper limit and at the same time an injection quantity is below a lower limit.

13. The fault analysis device according to claim 12, wherein the fault analysis device is set up to calculate injection quantities in in each case one of the plurality of cylinders from the change in the angular speed of the internal combustion engine.

14. The fault analysis device according to claim 10, wherein the fault analysis device is set up to compare the average value of the parameters with an average value of the parameters without adaptation in order to check the result of the fault analysis.

15. A fault analysis method for an internal combustion engine having a plurality of cylinders, comprising:
  determining an angular speed of the internal combustion engine, and
  adapting a parameter of the combustion process of one of the plurality of cylinders in order to equalize the times in which the internal combustion engine covers each of a plurality of angular intervals corresponding to the plurality of cylinders, and
  comparing an average value of the adapted parameter to at least one of a lower limit and an upper limit,
  comparing the average value of the parameter with an average value of the parameter without adaptation, and
  determining, based on (a) the comparison of an average value of the adapted parameter to the at least one of the lower limit and the upper limit and (b) the comparison of the average value of the parameter with the average value of the parameter without adaptation, that the one of the plurality of cylinders is defective.

16. The fault analysis method according to claim 15, wherein further parameters of the other cylinders are adapted in order to keep the internal combustion engine rotational speed constant.

17. The fault analysis method according to claim 16, wherein the parameter is the injection time at which fuel is injected into the one of the plurality of cylinders, and wherein the further parameters comprise an injection time for at least one of the other cylinders.

* * * * *